United States Patent [19]

Turner et al.

[11] 4,438,461
[45] Mar. 20, 1984

[54] INTEGRATED INPUT/OUTPUT SCANNER FOR ELECTRONIC DOCUMENT PROCESSING

[75] Inventors: William D. Turner, San Marino; Robert A. Sprague, Saratoga, both of Calif.

[73] Assignee: Xerox Corporation, Stamford, Conn.

[21] Appl. No.: 308,301

[22] Filed: Oct. 5, 1981

[51] Int. Cl.³ .............................................. H04N 1/22
[52] U.S. Cl. .................................... 358/302; 358/293; 346/160
[58] Field of Search ............... 358/302, 300, 296, 293, 358/285; 346/160

[56] References Cited

U.S. PATENT DOCUMENTS

| 4,241,990 | 12/1980 | Fisli | 358/300 |
| 4,281,904 | 8/1981 | Sprague | 350/356 |
| 4,356,347 | 10/1982 | Wiener | 358/296 |
| 4,367,925 | 1/1983 | Sprague | 350/355 |
| 4,374,617 | 2/1983 | Fisli | 355/8 |

OTHER PUBLICATIONS

"Polarizing Filters Plot Analog Waveforms", *Machine Design*, vol. 51, No. 17, 7/26/79, p. 62.
"Data Recorder Eliminates Problem of Linearity", *Design News*, 2/4/80, pp. 56–57.
"Light Gates Give Data Recorder Improved Hardcopy Resolution", *Electronic Design*, 7/19/79, pp. 31–32.

*Primary Examiner*—Alan Faber

[57] ABSTRACT

An integrated input/output scanner for electronic document processing and similar application comprises a photodetector array and an array of individually addressable electrodes which are supported on a suitable substrate, such as a silicon integrated circuit, and held closely adjacent a longitudinal surface of an optically transparent electro-optic element. For output scanning, a sheet-like light beam is transmitted through the electro-optic element in a generally longitudinal direction and is spatially modulated in accordance with data applied to the electrodes. Readout optics convert the spatial phase front or polarization modulation of the light beam into a correspondingly modulated intensity profile to expose a recording medium. On the other hand, for input scanning, a subject copy is imaged onto the photodetector array via the electro-optic element. The input imaging axis is selected to avoid any significant mixing between the input image and the output scanning beam so that there is little, if any, interference between the input scanning and output scanning functions. Moreover, if the input imaging is performed via the electro-optic element, the input imaging axis is aligned to be substantially normal to the intervening surfaces of the electro-optic element to avoid unwanted distortion of the image detected by the photodetector array.

12 Claims, 5 Drawing Figures

INTEGRATED INPUT/OUTPUT SCANNER FOR ELECTRONIC DOCUMENT PROCESSING

FIELD OF THE INVENTION

This invention relates to input/output scanners and, more particularly, to integrated input/output scanners for electronic document processors and the like.

BACKGROUND OF THE INVENTION

Substantial effort and expense have been devoted to the development of electronic document processors which are capable of performing various document processing functions, including facsimile transmission and reception, computer printing, and document editing and storage. One of the basic goals has been to efficiently and economically combine such an electronic document processing capability with a more or less conventional photocopying capability. See, U.S. Pat. No. 4,241,990, which issued Dec. 30, 1980 on an application of T. Fisli entitled "Multi-Purpose Optical Data Processor", and U.S. Pat. No. 4,374,617, which issued Feb. 22, 1983 on another application of T. Fisli entitled "Multi-Function Document Processor".

As is known, an electro-optic element having a plurality of individually addressable electrodes may be employed as a multigate light valve for electro-optic line printing. See, U.S.Pat. No. 4,281,904, which issued Aug. 4, 1981 on an application of R. A. Sprague et al. entitled "TIR Electro-Optic Modulator with Individually Addressable Electrodes". Also see, "Light Gates Give Data Recorder Improved Hardcopy Resolution," Electronic Design, July 19, 1979, pp. 31–32; "Polarizing Filters Plot Analog Waveforms," Machine Design, Vol. 51, No. 17, July 26, 1979, p. 62; and "Data Recorder Eliminates Problem of Linearity," Design News, Feb. 4, 1980, pp. 56–57.

Indeed, significant progress has been made in developing such light valves and in applying them to electro-optic line printing. For example, a copending and commonly assigned U.S. patent application of R. A. Sprague, which was filed Sept. 17, 1980 under Ser. No. 187,911 on an "Electro-Optic Line Printer," shows that an image represented by a serial input data stream may be printed on a standard photosensitive recording medium through the use of a multigate light valve that is illuminated by a more or less conventional light source. That disclosure is of interest primarily because it teaches input data sample and hold techniques for minimizing the output power required of the light source. Furthermore, a copending and commonly assigned U.S. patent application of W. D. Turner, which was filed Sept. 17, 1980 under Ser. No. 187,936 on "Proximity Coupled Electro-Optic Devices," teaches that the electrodes and the electro-optic element of a multigate light valve may be physically distinct components which are pressed or otherwise firmly held together to achieve "proximity coupling." Moreover, U.S. Pat. No. 4,367,925, which issued Jan. 11, 1983 on an application of R. A. Sprague et al. entitled "Integrated Electronics for Proximity Coupled Electro-Optic Devices," shows that it is relatively easy to make the necessary electrical connections to the many electrodes of a typical proximity coupled multigate light valve if the electrodes are formed by suitably patterning a metallization layer of, say, a VLSI silicon electrode driver circuit. A further copending and commonly assigned U.S. patent application of W. D. Turner et al., which was filed Sept. 17, 1980 under Ser. No. 187,916 on "Differential Encoding for Fringe Field Responsive Electro-Optic Line Printers," teaches that the number of electrodes required of a multigate light valve for line printing at a given resolution is reduced by a factor of two if the input data is differentially encoded.

SUMMARY OF THE INVENTION

In accordance with the present invention, a multigate light valve of the foregoing type is configured to provide an integrated input/output scanner for electronic document processing and the like. To that end, the input/output scanner comprises a photodetector array and an array of individually addressable electrodes which are supported on a suitable substrate, such as a silicon integrated circuit, and held closely adjacent a longitudinal surface of an optically transparent electro-optic element. For output scanning, a sheet-like light beam is transmitted through the electro-optic element in a generally longitudinal direction and is spatially modulated in accordance with data applied to the electrodes. Readout optics convert the spatial phase front or polarization modulation of the light beam into a correspondingly modulated intensity profile to expose a recording medium. On the other hand, for input scanning, a subject copy is imaged onto the photodetector array independently of or via the electro-optic element. The input imaging axis is selected to avoid any significant mixing between the input image and the output scanning beam so that there is little, if any, interference between the input scanning and output scanning functions. Moreover, if the input imaging is performed via the electro-optic element, the input imaging axis is aligned to be substantially normal to the intervening surfaces of the electro-optic element to avoid unwanted distortion of the image detected by the photodetector array.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
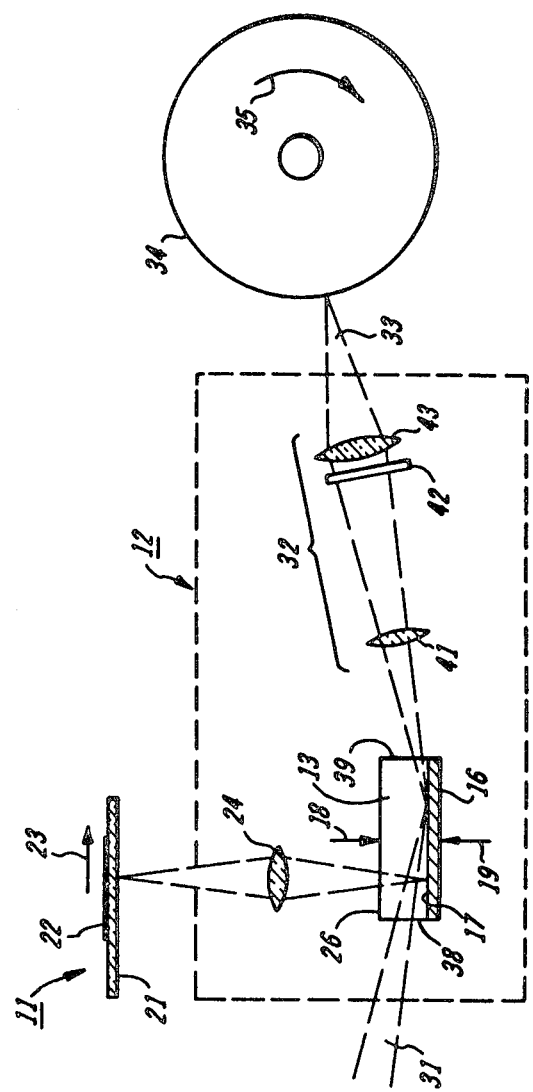
FIG. 1 is a simplified schematic side view of an electronic document processor having an integrated input/output scanner constructed in accordance with the present invention.
Figure 2:
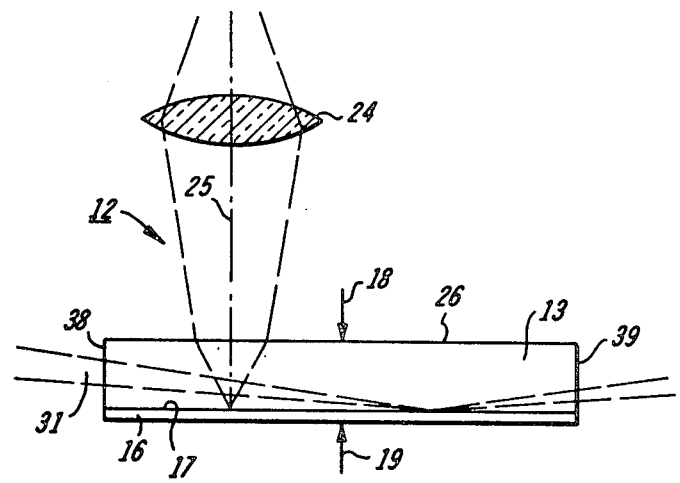
FIG. 2 is an enlarged side view of the input/output scanner shown in FIG. 1.

Turning now to the drawings, and at this point especially to FIGS. 1 and 2, there is an electronic document processor 11 (shown only in relevant part) having an integrated input/output scanner 12. In keeping with the present invention, the scanner 12 comprises an optically transparent electro-optic element 13, a linear photodetector array 14 or equivalent, and an array 15 of individually addressable electrodes 15a–15i (the arrays 14 and 15 can be seen in FIG. 4). Preferably, the photodetector array 14 and the electrode array 15 are supported on a separate substrate 16, such as a VLSI silicon circuit, and are held closely adjacent a longitudinal surface 17 of the electro-optic element 13. For example, the substrate 16 may be pressed against the electro-optic element 13, as indicated by the arrows 18 and 19, to essentially butt the photodetector array 14 and the electrode array 15 against the surface 17.

For input scanning, the document processor 11 includes a transparent platen 21 for supporting a subject copy 22, such as an original document, which in operation is illuminated (by means not shown) and advanced (by means also not shown) in a cross line or scan pitch direction relative to the linear photodetector array 14 (i.e., longitudinally of the electro-optic element 13), as indicated by the arrow 23. Furthermore, there is an imaging lens 24 for imaging successive lines of the subject copy 22 onto the photodetector array 14 via the electro-optic element 13, thereby causing the photodetectors 14a–14i (FIG. 4) to generate data samples representing the information content of the subject copy 22. As will be seen, the optical axis 25 of the input scanner is aligned perpendicularly to the intervening pair of parallel opposed longitudinal surfaces 17 and 26 of the electro-optic element 13 to minimize the image distorting effects of the electro-optic element 13.

Figure 3:
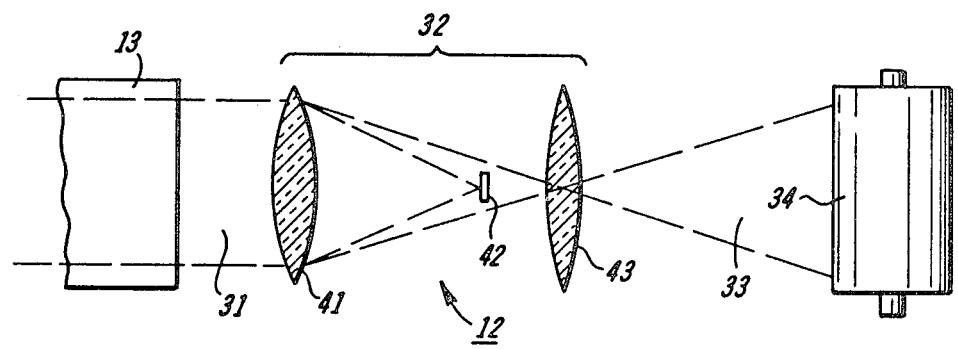
FIG. 3 is a partial plan view of the document processor of FIG. 1 to better illustrate the readout optics for the scanner.

In keeping with accepted output scanning or printing practices, a sheet-like collimated light beam 31 is transmitted in a generally longitudinal direction through the electro-optic element 13. The light beam 31 is supplied by a suitable source (not shown), such as a laser, and is laterally expanded to illuminate substantially the full width of the electro-optic element 13 (FIG. 3). Data applied to the electrodes 15a–15i create localized varations in the refractive index of the electro-optic element 13, thereby spatially modulating the phase front or polarization of the light beam 31 in accordance with such data. Accordingly, the input/output scanner 12 includes readout optics 32 for converting the phase or polarity modulation of the light beam 31 into a correspondingly modulated intensity profile, thereby providing an intensity modulated light beam 33 which is focused onto a photosensitive recording medium 34. In operation, the recording medium 34 is advanced in a cross line or line pitch direction relative to the light beam 33, as indicated by the arrow 35, and data samples sets representing picture elements for successive lines of an image are sequentially applied to the electrodes 15a–15i. Thus, the output scanner functions as a line printer.

The electro-optic element 13 may be formed from any one of a variety of optically transparent electro-optic materials. As of now, the most promising electro-optic materials appear to be $LiNbO_3$ and $LiTaO_3$, but there are others which warrant consideration, including BSN, KDP, $KD^xP$, $Ba_2NaNb_5O_{15}$ and PLZT. In the illustrated embodiment, the input/output scanner 12 is operated in a total internal relection (TIR) mode for output scanning. Consequently, the electro-optic element 13 suitably is a y-cut crystal of, say, $LiNbO_3$ having opposed, optically polished input and output faces 38 and 39, respectively, and opposed, optically polished longitudinal surfaces 17 and 25, respectively. As will be seen, the longitudinal surface 17 of the crystal internally relects the light beam 31 to achieve a TIR mode of operation.

Figure 4:
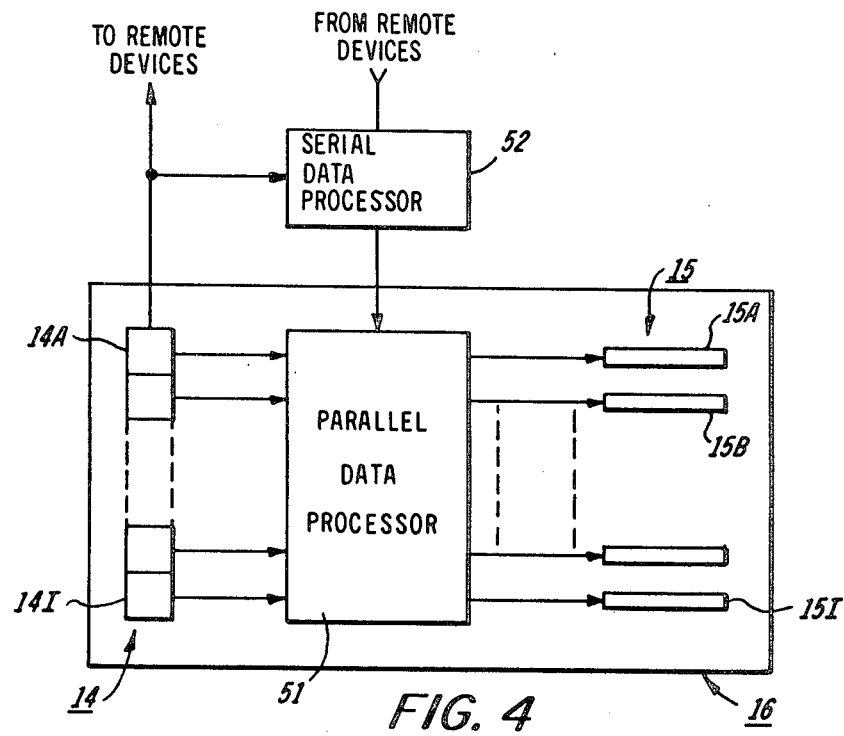
FIG. 4 is a schematic block diagram showing a photodetector array and a electrode array for input scanning and output scanning, respectively and typical image processors.

More particularly, for a TIR mode of operation, the light beam 31 is applied to the electro-optic element 13 at a grazing angle of incidence relative to its longitudinal surface 17 (i.e., an angle no greater than the critical angle of incident for total internal reflectance therefrom) and is brought to a wedge shaped focus (by means not shown) on the reflecting surface 17 at approximately the longitudinal midline of the electrode array 15 (FIG. 4). Consequently, the light beam 31 totally internally reflects from the surface 17 and interacts, both before and after such reflection, with any electric fringe fields that have been coupled into the electro-optic element 13 by the electrodes 15a–15i. As will be appreciated, proximity coupling is relied on in the illustrated embodiment to cause those fields to penetrate into the electro-optic element 13. There is little, if any, interference between the input and output scanning functions of the scanner 12 because (1) the light beam 31 does not mix with the input image and (2) any phase front or polarization modulation of the input image does not affect the image detected by the photodetectors 14a–14i (FIG. 4).

For the sake of this description it will be assumed that the phase front of the light beam 31 is modulated in accordance with the data applied to the electrodes 15a–15i. Hence, Schlieren central dark field or bright field imaging optics are used to convert the spatial phase front modulation of the light beam 31 into a correspondingly modulated intensity profile and to supply any magnification that may be needed to obtain an image of the desired size on the recording medium 34. In even more detail, as shown in FIGS. 1 and 3, the readout optics 32 are central dark field optics comprising a field lens 41, a central stop 42, and an imaging lens 43. The field lens 41 is optically aligned between the output face 39 of the electro-optic element 17 and the stop 42 to focus substantially all of the zero order diffraction components of the modulated light beam 31 onto the stop 42. However, the higher order diffraction components of the light beam 31 scatter around the stop 42 and are collected by the imaging lens 43 to provide the intensity modulated light beam 33 for exposing the recording medium 34.

Of course, if the light beam 31 is polarized (by means not shown) before being applied to the electro-optic element 13, its polarization will be spatially modulated in accordance with the data applied to the electrodes 15a–15i. In that event, a polarization analyzer (also not shown) may be used to provide the intensity modulated light beam 33.

Referring to FIG. 4, for increased simplicity and reliability, the photodetector array 14 and the electrode array 15 preferably are components of a VLSI silicon circuit 16. Standard VLSI circuit fabrication techniques may be used to form a plurality of charge couple device (CCD) or photodiode cells 14a–14i in adjacent alignment on such a circuit, thereby defining the photodetector array 14. Moreover, the metallization layer of such a circuit may be suitably patterned to define the individually addressable electrodes 15a-15i. As will be seen, the photdetector array 14 and the electrode array 15 are laid out in parallel spaced alignment on the VLSI circuit 16 to extend across substantially the full width of the electro-optic element 13 (FIG. 2). Typically, each of the electrodes 15a-15i is about 10 microns wide, and the interelectrode gap spacing is about the same. In this particular embodiment, there are equal numbers of photodetector cells 14a-14i and electrodes 15a-15i, and each of the electrodes 15a-15i is individually addressable. Nevertheless, it should be understood that most any ratio of photodetector cells to individually addressable electrodes may be accommodated, even if the document processor 11 is to be used for electronic copying. Moreover, it should be noted that ground plane electrodes (not shown) could be interleaved with the individually addressable electrodes 15a-15i.

As will be appreciated, other circuits may be included as a part of the VLSI circuit 16 or connected thereto. For example, as shown, the VLSI circuit 16 comprises an integrated or "on-board" parallel data processor 51 for digitizing the data samples generated by the photodetector cells 14a-14i and for differentially encoding those samples for application to the electrodes 15a-15i, thereby enabling the document processor 11 (FIG. 1) to operate in an electronic copier mode. A function generator (not shown) also could be built into the data processor 51 to superimpose an electronic screening function on the differentially encoded data for half tone printing. To account for the various image processing functions the data processor 51 may perform, the data samples applied to the electrodes 15a-15i are referred to hereinafter as "processed samples," but that designation is not intended to imply that the data samples have been subjected to any particular transformation. To carry this example even further, there is a separate serial data processor 52 which is connected to receive data samples which are serially shifted out of the photodetector cells 14a-14i and to apply data samples to the electrodes 15a-15i via the processor 51. The serial data processor 52 not only can perform the digitizing, encoding and screening functions of the parallel data processor 51, but also can accommodate communications to and from remote devices (not shown). The details of the data processors 51 and 52 are beyond the scope of the present invention, particularly since a wide variety of implementations will be evident to persons skilled in the image processing art. Of course, a comprehensive listing of the image processing functions that the data processors 51 and 52 might be configured to perform is not feasible, but data interpolation, merging of real and artificial images, and image enhancement are clearly among them.

Figure 5:
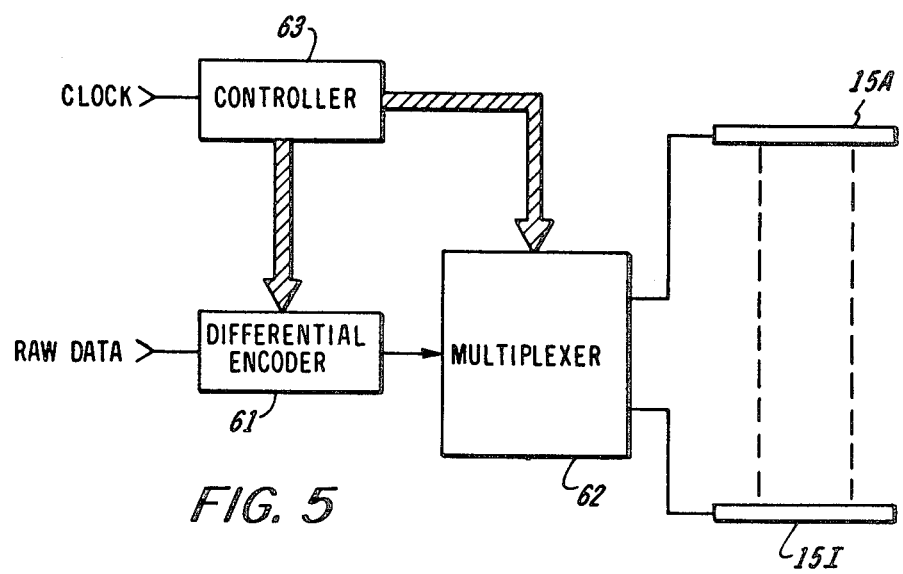
FIG. 5 is a simplified block diagram of a system for applying differentially encoded input data samples to the electrodes of the input/output scanner shown in FIG. 4.

Turning to FIG. 5, to supply the differentially encoded data samples for the electrodes 15a-15i in response to a serial stream of data samples, there is a differential encoder 61 for differentially encoding the input samples on a line-by-line basis and a multiplexer 62 for rippling the encoded data samples onto the electrodes 15a-15i. A controller 63 synchronizes the encoder 61 and the multiplexer 62 to match the encoding rate and the ripple rate to the data rate of the serial data stream. Alternatively, data buffers (not shown) could be provided to allow for variations in those rates.

As a matter of definition, each differentially encoded data sample, other than the first sample for each line of the image, has a magnitude which differs from the magnitude of the previous differentially encoded sample by an amount corresponding to the magnitude of a particular input data sample. The first differentially encoded sample for each line of the image is referenced to a predetermined potential, such as ground. Thus, when the differentially encoded data samples for any given line of an image are applied to the electrodes 15a-15i, all picture elements for that line are faithfully represented by the magnitude of the voltage drops appearing between respective pairs of neighboring electrodes. Preferably, the differentially encoded data samples are binary digital data, but analog data may also be differentially encoded for application to the electrodes 15a-15i.

It will be evident that there are many variations to the present invention. For example, the electrodes 15a-15i could be tilted at the Bragg angle relative to the optical axis of the output scanner. Another possibility is that the electrodes 15a-15i could be convergent on the entrance pupil of the imaging lens 43, thereby allowing for the use of non-telecentric imaging optics.

CONCLUSION

In view of the foregoing, it will now be understood that the present invention provides a compact and reliable integrated input/output scanner for electronic document processing and other applications.

What is claimed is:

1. An integrated input/output scanner for genertirg a first group of data samples to represent the information content of a subject copy and for exposing a photosensitive recording medium in accordance with a second group of data samples representing picture elements of an image; said scanner comprising an optically transparent electro-optic element;
   an array of photodetectors;
   an array of individually addressable electrodes distributed in spaced apart relationship laterally of said electro-optic element adjacent a longitudinal surface thereof;
   a substrate for supporting said photodetector array and said electrode array;
   means for transmitting a light beam in a generally longitudinal direction through said electro-optic element, said light beam being collimated laterally of said electro-optic element;
   means for imaging said subject copy onto said photodetector array without any appreciable mixing with said light beam, whereby said photodetectors generate said first group of data samples;
   means for supplying said second group of data samples;
   means for applying said second group of data samples to said electrodes for spatially modulating said light beam in accordance with said picture elements; and
   means for focusing said modulated light beam on said recording medium to expose said recording medium in accordance with said image.

2. The input/output scanner of claim 1 wherein
   said substrate is an integrated circuit, and
   said integrated circuit is maintained closely adjacent said longitudinal surface of said electro-optic element to proximity couple electric fields into said electro-optic element for modulating said light beam in accordance with said second group of data samples.

3. The input/output scanner of claim 2 wherein said longitudinal surface is one of a pair of parallel opposed longitudinal surfaces of said electro-optic element, and said subject copy is imaged onto said photodetector array via said electro-optic element on an axis which is substantially normal to said longitudinal surfaces.

4. The input/output scanner of claim 2 wherein said means for supplying said second group of data samples are coupled between said photodetectors and said electrodes, whereby said second group of samples are supplied in response to said first group of samples, thereby providing an electronic copier mode of operation for said scanner.

5. The input/output scanner of claim 2 further including means for transmitting said first group of data samples to a remote device and for receiving said second group of samples from a remote device for a communicating mode of operation.

6. The input/output scanner of claim 1 wherein said longitudinal surface of said electro-optic element is an optically polished, reflecting surface, and said light beam is applied to said electro-optic element at a grazing angle of incident relative to said longitudinal surface for total internal reflection therefrom.

7. The input/output scanner of claim 6 wherein said imaging means sequentially images successive lines of said subject copy onto said photodetectors to scan said subject copy on a line-by-line basis, and said second group of samples comprise sequential sample sets representing picture elements for successive lines of said image, and said sample sets are sequentially applied to said electrodes to print said image on a line-by-line basis.

8. The input/output scanner of claim 7 wherein said substrate is an integrated circuit, and said integrated circuit is maintained closely adjacent said longitudinal surface of said electro-optic element to proximity couple electric fields into said electro-optic element for modulating said light beam in accordance with said second group of data samples.

9. The input/output scanner of claim 8 wherein each of said electrodes is individually addressable, and said electric fields are fringe fields; and further including means for differentially encoding said second group of data samples for application to said electrodes.

10. The input/output scanner of claim 8 wherein said means for supplying said second group of data samples are coupled between said photodetectors and said electrodes, whereby said second group of samples are supplied in response to said first group of data samples, thereby providing an electronic copier mode of operation for said scanner.

11. The input/output scanner of claim 8 further including means for transmitting said first group of data samples to a remote terminal and for receiving said second group of samples from a remote terminal for a communicating mode of operation.

12. The input/output scanner of claim 8 wherein said longitudinal surface is one of a pair of parallel opposed longitudinal surfaces of said electro-optic element, and said subject copy is imaged onto said photodetector array via said electro-optic element on an axis which is substantially normal to said longitudinal surfaces.

* * * * *